United States Patent
Harich

[11] 3,852,436
[45] Dec. 3, 1974

[54] BIOCIDAL COMPOSITIONS AND THEIR METHOD OF PREPARATION EMPLOYING A GRAPEFRUIT DERIVATIVE

[75] Inventor: Jakob Harich, Orlando, Fla.

[73] Assignee: Rush-Hampton, Inc., Longwood, Fla.

[22] Filed: Apr. 29, 1971

[21] Appl. No.: 138,817

[52] U.S. Cl............... 424/195, 424/232, 424/233, 424/263, 424/288, 424/329, 106/15 AF
[51] Int. Cl............................ A01n 9/02, A01n 9/08
[58] Field of Search .......... 424/232, 235, 195, 263, 424/288, 329

[56] References Cited
UNITED STATES PATENTS

| | | | |
|---|---|---|---|
| 3,057,920 | 10/1962 | Schramm | 424/233 |
| 3,058,881 | 10/1962 | Wilde | 424/232 |
| 3,288,669 | 11/1966 | Hechenbleikner | 424/288 |

OTHER PUBLICATIONS

Chemical Abstracts, Vol. 65 (1966) p. 15,338h.

Chemical Abstracts, Vol. 65 (1966) p. 15,338g.

*Primary Examiner*—Vincent D. Turner
*Attorney, Agent, or Firm*—Finnegan, Henderson, Farabow & Garrett

[57] ABSTRACT

Novel biocidal compositions are prepared adding tetrachloroethylene with an organic alcoholic ether such as 2-phenoxy-ethanol to form a first intermediate mixture, and then successively adding to the first intermediate mixture (a) 2,3,5,6-tetrachloro-4-(methylsulfonyl) pyridine, (b) salicylanilide, (c) tributyltin neodecanoate, (d) 3,4,5-tribromosalicylanilide, and (e) n-alkyl substituted dimethyl benzyl ammonium chloride, wherein the n-alkyl substituent comprises a mixture of 50% $C_{12}H_{25}$, 40% $C_{14}H_{29}$ and 10% $C_{16}H_{33}$ groups and subsequently adding thereto a grapefruit derivative.

12 Claims, No Drawings

BIOCIDAL COMPOSITIONS AND THEIR METHOD OF PREPARATION EMPLOYING A GRAPEFRUIT DERIVATIVE

This invention relates to the preparation and use of new biocidal compositions. More particularly it relates to novel organic biocidal compositions, to the process of preparing these compositions, and to the methods for their effective use.

Fungicidal and bactericidal compositions employed heretofore generally present one or more problems in production or use. Thus, for example, fungicidal and fungistatic chlorinated phenols are normally highly toxic, necessitating special handling. In addition, they cause discoloration of plastics and paint films; are corrosive to metals; and are usually ineffective at low treatment levels. Similarly, fungicidal mercaptodicarboximide compounds when used in clear formulations of coatings and plastic reduce the heat and light stability of the formulation and are in addition malodorous. In like manner, many copper-containing fungicides are high in cost; discolor the paints and plastics in which they are incorporated; are effective over an abbreviated period of time; and involve difficulty in formulation because of poor solubility characteristics. Phenyl mercurials are also employed as biocidal agents, but are uneconomical, highly toxic, corrosive to metals, and prohibited in certain military specifications for plastic materials.

Accordingly, primary objects of the present invention are to provide novel compositions which are particularly useful in preventing the growth of microorganisms, and to provide a method of preparing such compositions.

A further object of this invention is to provide thermally stable biocidal organic compositions which are highly effective and readily incorporated in a wide range of resins, paints, and plastics.

Additional objects and advantages of the invention will be set forth in part in the description which follows, and in part will be obvious from the description, or may be learned by practice of the invention, the objects being realized and attained by means of the compounds, compositions, methods, processes, steps and procedures particularly pointed out in the appended claims.

In accordance with the invention, a process is provided for preparing a novel biocidal composition by adding tetrachloroethylene with an organic alcoholic ether to form a first intermediate mixture; adding to the mixture 2,3,5,6-tetrachloro-4-(methylsulfonyl) pyridine, salicylanilide, and a polyhalosubstituted diaryl and heating to obtain a reaction mixture; and adding to the reaction mixture substituted dimethyl benzyl ammonium chloride and heating to obtain a final reaction product.

Preferably, the alcoholic ether used to prepare the final reaction product is 2-phenoxy-ethanol, diethylene glycol methyl ether, ethylene glycol ethyl ether or mixtures thereof. The polyhalosubstituted diaryl is preferably 3,4,5-tribromosalicylanilide, 2,4,4'-trichloro-2'-hydroxydiphenyl ether or a mixture thereof. The substituted dimethyl benzyl ammonium chloride substituent is preferably a diisobutylphenoxyethoxyethyl group, a diisobutylcresoxyethoxyethyl group, or an n-alkyl substituent wherein the n-alkyl substituent is an admixture comprising about 50% $C_{14}H_{29}$ groups, about 40% $C_{12}H_{25}$ groups, and about 10% $C_{16}H_{32}$ groups.

Each addition is preferably formed by heating the resulting mixture at a temperature between about 180° and 200°F. Each addition is preferably carried out for about 5 to 10 minutes before the next compound is added. The additions are preferably conducted with agitation, and after addition of the last compound, the agitation is terminated and the temperature maintained at 180° to 200°F for about 2 hours.

It is also preferred that trihydrocarbyltin neoalkanoate be added after the addition of the salicylanilide.

The term biocidal as employed throughout this specification is intended to designate an agent characterized by fungicidal, fungistatic, bactericidal and/or bacteriostatic activity.

The invention consists of the novel steps, methods, processes, procedures, compositions, products, and improvements shown and described.

The new compositions of the present invention exhibit antimicrobial activity against a number of microorganisms and can be formulated into paints, plastics and resins to provide new compositions which exhibit improved antimicrobial or biocidal activity. To facilitate handling as biocidal agents, the novel compositions may be formulated into solutions of the usual organic solvents and plasticizers or into water dispersions.

In accordance with the invention, the first step in preparing the novel compositions of the present invention comprises adding tetrachloroethylene with an organic alcoholic ether at an elevated temperature to form a mixture. The addition is generally carried out using a weight ratio of tetrachloroethylene to alcoholic ether of about between 3:2 and 2:3. Equal weights of tetrachloroethylene and the alcoholic ether are presently preferred. To prepare approximately one pound of the final novel composition, preferably between 140 to 160 gms. tetrachloroethylene are mixed with 140 to 160 gms. of the alcoholic ether, although lower amounts of about 80 gms. of these compounds can also be used.

The alcoholic ethers useful in this first addition step include 2-phenoxyethanol, diethylene methyl ether, diethylene glycol methyl ether, ethylene glycol ethyl ether and mixtures of two or more of these ethers. The ethers can be mixed in any weight proportion to form the alcoholic ether component of the first addition step.

The addition of tetrachloroethylene with the alcoholic ether is preferably carried out at a temperature of 180° to 200°F with agitation, for about 5 to 10 minutes or until a clear solution is obtained.

A suitable system for carrying out this first stage addition comprises a stainless steel reactor vessel, a cover for the vessel and a mixer blade powered by a motor mounted on the cover for the vessel.

The alcoholic ether and tetrachloroethylene used in the first addition step are preferably U.S.P. or technical grade. When using technical grade tetrachloroethylene, it is desirable to add about one percent by weight of tetrachloroethylene of a stabilizer such as ethyl alcohol.

At the end of the addition of the tetrachloroethylene with the alcoholic ether a first intermediate mixture is formed which is liquid.

In accordance with the invention the first intermediate addition product has added thereto 2,3,5,6-tetrachloro-4-(methylsulfonyl) pyridine, salicylanilide, and a polyhalosubstituted diaryl. The addition of these compounds is carried out at an elevated temperature to obtain a reaction mixture. The 2,3,5,6-tetrachloro-4-(methylsulfonyl) pyridine is commercially available under the trademark "Dowicil S13" from Dow Chemical Company, Midland, Mich., as a solid in powder form.

The pyridine compound preferably is the first compound added to the first intermediate mixture. Preferably, between about 16–21 gms. of 2,3,5,6-tetrachloro-4-(methylsulfonyl) pyridine are added per 140 to 160 gms. of alcoholic ether to produce approximately one pound of the final composition of the invention.

The addition of the pyridine compound with the first intermediate mixture is preferably carried out at a temperature of 180° to 200°, with agitation, for about 5 to 10 minutes or until a clear solution is obtained. During this addition, the reaction vessel is preferably operated at a pressure of 5 to 10 p.s.i.g.

In accordance with the invention, salicylanilide is preferably added upon the completion of the addition of the 2,3,5,6-tetrachloro-4-(methylsulfonyl) pyridine. Salicylanilide is commercially obtainable from B. L. Lemke and Co., Inc., Lodi, N.J. as a powder NF grade.

Preferably to produce one pound of the novel compositions of this invention, between about 40 to 46 gms. of salicylanilide are added per 140 to 160 gms. of alcoholic ether. The addition of the salicylanilide is preferably carried out at a temperature of 180° to 200°F, with agitation for about 5 to 10 minutes or until a clear solution is obtained.

In accordance with the invention, the polyhalosubstituted diaryl is preferably added upon the completion of the addition of salicylanilide. The polyhalosubstituted diaryls useful in the invention generally are of the formula:

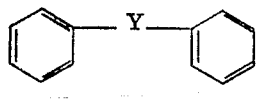

wherein Y is —O— or —CONH—. Suitable polyhalosubstituted diaryls useful in the invention include 3,4,5-tribromosalicylanilide and 2,4,4'-trichloro-2'-hydroxydiphenyl ether and mixtures thereof. The 3,4,5-tribromosalicylanilide is obtainable as a solid in powder form from Sherwin-Williams Company, Toledo, Ohio, and the 2,4,4'-trichloro-2'-hydroxydiphenyl ether is obtainable from Geigy Chemical Corp., Ardsley, N.Y., under the tradename TP300.

Preferably between about 30–50 gms. are added per 140 to 160 gms. of alcoholic ether to produce approximately one pound of the final compositions of the invention. The amount of polyhalosubstituted diaryl can, however, be substantially reduced to, for example, 10–17 gms. per 140–160 gms. of alcoholic ether by increasing the amount of 2,3,5,6-tetrachloro-4-(methylsulfonyl) pyridine about 50 percent and by increasing the amount of salicylanilide by about 25 percent.

The addition of the substituted diaryl is preferably carried out at a temperature of 180° to 200°F, with agitation, for about 5 to 10 minutes or until clear solution is obtained.

In accordance with the invention, at least one substituted dimethyl benzyl ammonium chloride is added to the reaction mixture and the mixture is heated to obtain the final novel compositions of the present invention. The substituted dimethyl benzyl ammonium chloride substituent can be a diisobutylphenoxyethoxyethyl group or a diisobutylcresoxyethoxyethyl group, or an n-alkyl substituent. The n-alkyl substituent preferably comprises a mixture of about 50 percent $C_{14}H_{28}$ groups, about 40 percent $C_{12}H_{25}$ groups, and about 10 percent $C_{16}H_{33}$ groups. Suitable n-alkylated mixtures of alkyl dimethyl benzyl ammonium chloride can be obtained commercially from Rohm and Haas, Philadelphia, Pa. under the trade name "Hyamine 3,500" as an 80 percent concentrate in ethyl alcohol, or from Geigy Chemical Corp. Ardsley, N.Y. Diisobutylphenoxyethoxyethyl dimethyl benzyl ammonium chloride is obtained from Rohm and Haas under the trade name "Hyamine 1,622" as a solid in powder form, and diisobutylcresoxyethoxyethyl dimethyl benzyl ammonium chloride is also obtainable from Rohm and Haas under the trade name "Hyamine 10-X" as a solid in powder form. Mixtures of the various substituted dimethyl benzyl ammonium chlorides can also be employed, preferably in equal weight percentages.

Preferably between about 3–5 gms. of the substituted dimethyl benzyl ammonium chlorides are added per 140 to 160 gms. of alcoholic ether to produce approximately one pound of the final compositions of the invention.

The heating of the substituted dimethyl benzyl ammonium chloride with the reaction mixture is preferably carried out at a temperature of 180° to 200°F for about two hours at a pressure of about 5 to 10 p.s.i.g. During addition of the substituted dimethyl benzyl ammonium chloride, agitation is continued, but this agitation is then stopped promptly when the addition is completed. After about two hours, the pressure is released and the temperature is allowed to fall to 90°–100°F. The final composition of this invention can then be recovered by removing the reaction mixture from the vessel and filtering it through a stainless steel 9–10 micron 120 mesh screen.

In accordance with one embodiment of the invention, trihydrocarbyltin neoalkanoate is added to the reaction mixture. The addition of trihydrocarbyltin neoalkanoate is preferably conducted after the addition of salicylanilide, or after the addition of polyhalosubstituted diaryl, and carried out at a temperature of 180° to 200°F, with agitation, for about 5 to 10 minutes, or until a clear solution is obtained.

Trihydrocarbyltin neoalkanoates can be commercially obtained from Cincinnati Milacron Co., West Street Reading, Ohio as a liquid, or can be prepared in conventional fashion by heating a trihydrocarbyltin trichloride with the sodium or potassium salt of the neoalkanoic acid and removing the sodium or potassium by-product. The reaction is usually carried out in the presence of an organic solvent such as isopropyl alcohol. Neoalkanoic acids are characterized by having the neo carbon atom, i.e., a carbon atom attached to four different carbon atoms, adjacent to the carboxyl group. Trihydrocarbyltin neoalkanoates useful in the present invention include tributyltin neodecanoate, tributyltin neopentanoate, tributyltin neohexanoate, triethyltin neodecanoate and trimethyltin neodecanoate. Tributyltin neodecanoate is presently preferred.

When adding trihydrocarbyltin neoalkanoates to the reaction mixture, the amount of polyhalosubstituted diaryl needed to produce the compositions of the present invention can be reduced. Thus, for example, to produce approximately one pound of the novel compositions of the present invention, 61–85 gms. of trihydrocarbyltin neoalkanoate and 10–17 gms. of the polyhalosubstituted diaryl are added to the reaction mixture. Lesser amounts of alkanoate can also be used with a corresponding increase in the amount of polyhalosubstituted diaryl compound.

In a preferred embodiment of the invention a grapefruit derivative prepared by reacting the pulps of grapefruit with an organic alcohol or ketone in the presence of a free radical initiator is added to the reaction mixture. This grapefruit derivative and the method for its preparation are fully described in copending U.S. Pat. application Ser. No. 126,251, entitled "Citrus-Based Chemical Compounds and Process for Their Production," filed Mar. 19, 1971 and assigned to the same assignee as the present invention. The grapefruit derivative useful in the present invention is the intermediate reaction product described in Ser. No. 126,251 and is referred to therein as "CA-90 Base." For a fuller description of the process for preparing the grapefruit derivative, reference is made to that application, and its contents are hereby incorporated by reference.

Briefly, the reaction of the grapefruit with the alcohol or ketone is preferably conducted at a temperature of about 110° to about 140°F. The pulp reactant comprises the inner pulp of fresh grapefruit having a low acid content as shown by a pH of about 2.5 to 5. The ratio of alcohol or ketone to grapefruit pulp used in the reaction can be varied widely. Preferably, the weight ratio of grapefruit pulp to alcohol or ketone is about 1:2. The alcohol or ketone is continuously circulated through the pulp for a period of about 12 to 24 hours to produce the derivative. This derivative is a storage stable liquid.

Both monohydric and polyhydric alcohols can be used in preparing the grapefruit derivative useful in this invention. Thus, suitable alcohols include methanol, ethanol, isopropanol, n-propanol, n-butanol, allyl alcohol, amyl alcohol, tertamyl alcohol, octyl alcohol, benzyl alcohol, ethylene glycol, propylene glycol, diethylene glycol, dipropylene glycol, triethylene glycol, tetraethylene glycol, glycerine and the like. Acetone is the presently preferred ketone reactant. The polyhydric aliphatic alcohols such as propylene glycol and glycerine are greatly preferred reactants in preparing the grapefruit derivative. The reaction is preferably carried out in the presence of a free radical initiator, most preferably ultraviolet (UV) light. Conventional radical initiators, such as the chemical initiators tertiary butyl hydroperoxide, azobisbutyronitrile, dicumyl peroxide or the like can also be used. UV light has been found to function well in preparing grapefruit derivatives and is presently preferred. UV light may be supplied by commercially available UV light sources or even by sunlight.

For example, the CA-90 Base can be prepared by adding to a laboratory stainless steel reactor one pound (454 gms.) of fresh grapefruit pulp prepared by mechanically removing the outer rind from the inner pulp of grapefruit picked 2 days previously and 2 pounds (908 gms.) of propylene glycol USP. The liquid portion of the reaction mixture is circulated through the grapefruit pulp and through Teflon tubing surrounded by an ultraviolet light source for a period of 24 hours. The system is maintained at a temperature of 110° to 120° during this period. A total of 872 gms. of reaction product is then separated from the grapefruit pulp residue by straining through a 16 mesh screen. This product is the CA-90 Base material and is storage stable for an indefinite time.

When using the grapefruit derivative in the practice of the present invention, preferably from 20 to 85 gms. of the derivative are employed per 140 to 160 gms. of alcoholic ether. The grapefruit derivatives, however, can also be used to replace up to 30 percent by weight of the tetrachloroethylene and/or alcoholic ether. The grapefruit derivative is preferably added to the reaction mixture any time after the addition of the 2,3,5,6-tetrachloro-4-(methylsulfonyl) pyridine. The use of this grapefruit derivative affords increased compatibility of the composition of this invention with acrylic and alkyd resins and latex emulsions.

The order of addition and amounts of the compounds used to produce typical compositions of the invention is illustrated in the following formulation where the compounds are listed in the order that they are mixed. This formulation is produced without the use of trihydrocarbyltin neoalkanoate.

Formulation 1

| | | |
|---|---|---|
| 1) | Tetrachloroethylene | 120 – 140 gms. |
| 2) | Diethylene methyl ether | 120 – 140 gms. |
| 3) | 2,3,5,6-Tetrachloro-4-(methylsulfonyl) pyridine | 16 – 21 gms. |
| 4) | Salicylanilide | 40 – 46 gms. |
| 5) | 2,4,4'Trichloro-2'-Hydroxydiphenyl ether | 30 – 50 gms. |
| 6) | n-alkyl (50% $C_{14}$, 40% $C_{12}$, 10% $C_{16}$) dimethyl benzyl ammonium chloride | 3 – 5 gms. |
| 7) | CA-90 base material | 45 – 62 gms. |

Another formulation illustrating the order of addition and amounts of compounds used to produce typical compositions is as follows:

Formulation 2

| | | |
|---|---|---|
| 1) | Tetrachloroethylene | 140 – 160 gms. |
| 2) | 2 phenoxy ethanol, or diethylene glycol methyl ether, or ethylene glycol methyl ether, or diethylene methyl ether, or mixtures thereof | 140 – 160 gms. |
| 3) | 2,3,5,6-Tetrachloro-4-(methylsulfonyl) pyridine | 16 – 21 gms. |
| 4) | Salicylanilide NF | 40 – 46 gms. |
| 5) | 3,4,5-tribromosalicylanilide, or 2,4,4'trichloro-2'-Hydroxydiphenyl ether, or mixtures thereof | 10 – 17 gms. |
| 6) | n-alkyl (50% $C_{14}$; 40% $C_{12}$; 10% $C_{16}$ dimethyl benzyl ammonium chloride, or diisobutylcresoxyethoxyethyl dimethyl benzyl ammonium chloride, monohydrate, or mixtures thereof | 3 – 5 gms. |
| 7) | CA-90 base material | 70 – 85 gms. |

The following formulation is similar to Formulation 2 except that tributyltin neodecanote is included and the amount of the pyridine compound and salicylanilide are increased.

Formulation 3

| | | |
|---|---|---|
| 1) | Tetrachloroethylene | 140 – 160 gms. |
| 2) | 2 phenoxy ethanol, diethylene glycol methyl ether, or ethylene glycol methyl ether, or diethylene methyl ether, or mixtures thereof | 140 – 160 gms. |
| 3) | 2,3,5,6-Tetrachloro-4-(methylsulfonyl) pyridine | 30 – 37 gms. |

Formulation 3-Continued

| | | |
|---|---|---|
| 4) | Salicylanilide NF | 50 – 60 gms. |
| 5) | Tributyltin neodecanote | 61 – 85 gms. |
| 6) | 3,4,5-tribromosalicylanilide, or 2,4,4'trichloro-2'-Hydroxydiphenyl ether, or mixtures thereof | 10 – 17 gms. |
| 7) | n-alkyl (50% $C_{14}$; 40% $C_{12}$; 10% $C_{16}$ dimethyl benzyl ammonium chloride, or diisobutylcresoxyethoxyethyl dimethyl benzyl ammonium chloride, monohydrate, or mixtures thereof | 3 – 5 gms. |
| 8) | CA-90 base material | 70–85 gms. |

The following four formulations are typical of the order of addition and amounts of compounds used when employing trihydrocarbyltin alkanoates.

Formulation 4

| | | |
|---|---|---|
| 1) | Tetrachloroethylene | 140 – 160 gms. |
| 2) | Diethylene glycol methyl ether | 140 – 160 gms. |
| 3) | 2,3,5,6-Tetrachloro-4-(methylsulfonyl) pyridine | 16 – 21 gms. |
| 4) | Salicylanilide | 40 – 46 gms. |
| 5) | Tributyltin neodecanoate | 61 – 85 gms. |
| 6) | 3,4,5-Tribromosalicylanilide | 10 – 17 gms. |
| 7) | n-alkyl (50% $C_{14}$, 40% $C_{12}$, 10% $C_{16}$) dimethyl benzyl ammonium chloride | 3 – 5 gms. |
| 8) | CA-90 base material | 25 – 35 gms. |

Formulation 5

| | | |
|---|---|---|
| 1) | Tetrachloroethylene | 140 – 160 gms. |
| 2) | Ethylene glycol Ethyl ether | 140 – 160 gms. |
| 3) | 2,3,5,6-Tetrachloro-4-(methylsulfonyl) pyridine | 16 – 21 gms. |
| 4) | Salicylanilide NF | 40 – 46 gms. |
| 5) | 2,4,4'Trichloro-2'Hydroxydiphenly ether | 20 – 35 gms. |
| 6) | Tributyltin neodecanoate | 41 – 50 gms. |
| 7) | n-alkyl dimethyl benzyl ammonium chloride (50% $C_{14}$, 40% $C_{12}$, 10% $C_{16}$) | 3 – 5 gms. |
| 8) | CA-90 base material | 25 – 35 gms. |

Formulation 6

| | | |
|---|---|---|
| 1) | Tetrachloroethylene | 140 – 160 gms. |
| 2) | 2-phenoxy-ethanol | 140 – 160 gms. |
| 3) | 2,3,5,6-Tetrachloro-4-(methylsulfonyl) pyridine | 16 – 21 gms. |
| 4) | Salicylanilide NF | 40 – 46 gms. |
| 5) | 2,4,4'Trichloro-2'-Hydroxydiphenyl ether | 10 – 17 gms. |
| 6) | Tributyltin neodecanoate | 61 – 85 gms. |
| 7) | Diisobutylcresoxyethoxyethyl dimethyl benzyl ammonium chloride, monohydrate | 3 – 5 gms. |
| 8) | CA-90 base material | 20 – 25 gms. |

Formulation 7

| | | |
|---|---|---|
| 1) | Tetrachloroethylene | 140 – 160 gms. |
| 2) | 2-phenoxy-ethanol | 140 – 160 gms. |
| 3) | 2,3,5,6-Tetrachloro-4-(methylsulfonyl) pyridine | 16 – 21 gms. |
| 4) | Salicylanilide | 40 – 46 gms. |
| 5) | Tributyltin neodecanoate | 61 – 85 gms. |
| 6) | 3,4,5-Tribromosalicyanilide | 10 – 17 gms. |
| 7) | n-alkyl (50% $C_{14}$, 40% $C_{12}$, 10% $C_{16}$) dimethyl benzyl ammonium chloride | 3 – 5 gms. |

The structures and components of the compositions of this invention have not clearly been substantiated at this time. Therefore, for purposes of the detailed description herein and for the appended claims the instant biocides will be characterized in terms of the reactants used in their preparation rather than structurally or by the individual components in the compositions.

The novel compositions of the present invention are clear liquids at room temperature, having a light amber color, a specific gravity at 60°F of 1.300, a pH of 5.5 to 5.6, and a flash point of 125°C. The novel compositions are not light or freeze sensitive, are storage stable, and are not corrosive or explosive.

The novel compositions of the present invention have great utility as antibacterial and antifungal agents, especially in plastic, paint, and rubber compositions.

These compositions are effective broad-spectrum, antimicrobial agents, and are particularly highly effective against gram-positive organisms. The following microorganisms are exemplary of those against which the present compounds are effective: *Staphylococcus aureus, Pseudomonas aeruginosa, Bacillus subtilis, Sarcina subtlava;* the fungi *Rhizopus nigricans*, Penivillium, Pollularia and Aspergillus; and the gram-negative bacteria Pseudomonas, Escherichia, and Serratia.

When employed as antimicrobial agents, the novel compositions of this invention can be formulated into solutions of the usual organic solvents and plasticizers, such as acetone, or dispersed in water, preferably by ultrasonification. They can be added to water based, acrylic, latex, vinyl, alkyl, and oil based paints at a concentration of preferably about 0.75–1 percent of total fluid ounces per gallon of paint, or a concentration of 0.1–1 weight ounces per 10 lbs. of paint.

Thus, in addition to the new biocides, this invention contemplates a composition susceptible to microbial attack containing a biocidal amount of the biocidal compositions as defined above. Illustrative of the new compositions are paints, plastics, waxes, adhesives, and the like.

This invention contemplates, in one of its embodiments, paint compositions containing from about 0.01 to about 1.0 percent by weight of the new biocides, as defined above. These paints provide films resistant to supporting the growth of microorganisms, especially fungi. It is a matter of common knowledge and experience that almost all paint films are subject to disfigurement and destruction by fungi if used under conditions which favor their growth. These conditions are very commonly found in breweries, bakeries, and dairies. Special problems also are noted in certain areas of the world where the climates are characterized by high humidities and temperatures. Thus, in the southern United States, in the West Indies, in West Africa, in Malaya and in the East Indies, and especially in India during the Monsoon season, fungus growth on paint is a very serious problem. Among the paints which can be protected against fungus growth by adding the biocides of this invention are "oil-base paints," which contain drying oils, either present as such or combined in resins. There is also contemplated the protection of emulsion paints; these are well known to serve as a vigorous growth media for fungi.

Paints and films can be protected by adding special ingredients which will prevent the growth of fungus in them. Among the substances which have been suggested in the art are mercurials, chlorinated phenols and sulfur-containing materials. The mercury compounds, while quite efficient, are exceedingly poisonous and great care must be taken in using them. The instant compounds offer the substantial advantage of providing good protection against the unwanted growth of microorganisms, and are significantly less toxic in the concentrations embodied than the commonly employed mercurials.

The new paint compositions of this invention can be prepared by techniques well within the capabilities of those skilled in the art. The biocides prepared as described in the examples to follow may be added to the paint after it is formulated, or they may be added during the preparation of the paint. It is especially convenient to grind the biocide with the pigment and a small amount of vehicle to insure complete and ready dispersion throughout the mixture. However, especially when small batches of paint are to be prepared, the biocides of the instant invention are conveniently stirred into the paint composition already mixed. The new compositions provide paints, especially those prepared by emulsion techniques, with substantially enhanced resistance to deterioration during storage. Here, the paint resists microorganism attack and growth in the can and, when applied as a coating, the resistance remains.

The compounds of this invention are especially effective at about 0.25 percent by weight of the paint composition. Among the deleterious fungi controlled by the instant biocides at these concentrations are A. Niger and P. Funieulosum. The instant biocides function effectively in alkyd enamels, of the white architectural type, and in latex paints, of the type disclosed in Volume 9, "Encyclopedia of Chemical Technology," Interscience, New York, 1952, pages 774 and 802.

This invention contemplates, in one of its embodiments, plastic compositions containing a biocide as defined herein above. It is well known that plastics compositions, especially those highly loaded with plasticizers, are subject to microbial attack, under adverse conditions. For example, plasticized polyvinyl chloride shower curtains, which regularly are exposed to conditions of elevated temperatures and high humidity, often suffer from the growth of fungi and other microorganisms. This causes development of atypical odors and colors. It has now been found that, through the incorporation of a minor amount of the instant biocide into the plastics composition, there is imparted substantial resistance to the growth of these microorganisms. Here, one of the advantages in using the instant compounds resides in the relative decrease in toxicity when compared to the exceedingly poisonous prior art stabilizers, among which might be mentioned in phenylmercuric acetate.

The stabilized plastic compositions can be formulated and compounded by techniques known to those skilled in the art. For example, if a plasticized polyvinyl chloride resin is to be prepared, the instant biocides can be mixed well with the powdered resin; this mixture then can be added to the plasticizers, and the entire formula, which may contain heat and light stabilizers as well, may be homogenized and cast into films. These typically would be useful in shower curtains and in other plastic compositions where microorganism growth is a problem. In addition to polyvinyl chloride, other illustrative plastics are polyolefins, such as, polyethylene, polypropylene, polyvinylidene chloride, copolymers thereof, and the like.

The following specific examples are given by way of illustration to further explain the principles of the invention. These examples are merely illustrative and are not to be understood as limiting the scope and underlying principles of the invention in any way. All percentages referred to herein are by weight unless otherwise specifically indicated. For ease of reference the biocidal compositions of this invention are sometimes referred to in the following examples as "CA-100".

EXAMPLE 1

This example illustrates the preparation of a biocidal composition of the present invention. To a reaction vessel are added 150 gms. of tetrachloroethylene and 150 gms. of 2-phenoxy-ethanol. These compounds are heated in the vessel at about 190°F for about 7 minutes with agitation until a clear solution is obtained. The temperature of the vessel is maintained at 190°F and 18 grams of 2,3,5,6-tetrachloro-4-(methylsulfonyl) pyridine are then added to the vessel with agitation. Following this addition, 45 grams of salicylanilide are added with agitation, and then 73 grams of tributyltin neodecanoate are added with agitation. Thereafter 4 grams of n-alkyl (50% $C_{14}$; 40% $C_{12}$, 10% $C_{16}$) dimethyl benzyl ammonium chloride are added to the vessel. Immediately upon completion of this last addition, agitation is stopped, and the vessel maintained at about 190°F for 2 hours at a pressure of 5 – 10 p.s.i.g. After 2 hours, the pressure is released and the temperature allowed to fall to 95°F. A stainless steel 9–10 micron 120 mesh is used to filter the contents of the vessel and the recovered liquid is the biocidal composition of this invention.

EXAMPLE 2

The general procedure of Example 1 is repeated with the following compounds being added in the listed order.

| | | |
|---|---|---|
| 1) | Tetrachloroethylene | 150 gms. |
| 2) | Diethylene glycol methyl ether | 150 gms. |
| 3) | 2,3,5,6-Tetrachloro-4-(methylsulfonyl) pyridine | 18 gms. |
| 4) | Salicylanilide | 43 gms. |
| 5) | Tributyltin neodecanoate | 66 gms. |
| 6) | 3,4,5-Tribromosalicylanilide | 15 gms. |
| 7) | n-alkyl (50% $C_{14}$, 40% $C_{12}$, 10% $C_{16}$) dimethyl benzyl ammonium chloride | 4.5 gms. |
| 8) | CA-9 base material | 28 gms. |

The CA-90 Base material is added with agitation immediately after the n-alkyl dimethyl benzyl ammonium chloride. Following this addition, agitation is stopped and the reaction mixture is heated for 2 hours. After cooling, the composition is recovered as in Example 1.

EXAMPLE 3

The general procedure of Example 2 is repeated with the following compounds being added in the listed order.

| | | |
|---|---|---|
| 1) | Tetrachloroethylene | 130 gms. |
| 2) | Diethylene methyl ether | 130 gms. |
| 3) | 2,3,5,6-Tetrachloro-4-(methylsulfonyl) pyridine | 19 gms. |
| 4) | Salicylanilide | 42 gms. |
| 5) | 2,4,4'Trichloro-2'-Hydroxy-diphenyl ether | 40 gms. |
| 6) | n-alkyl (50% $C_{14}$, 40% $C_{12}$, 10% $C_{16}$) | |

-Continued

| | |
|---|---|
| dimethyl benzyl ammonium chloride | 3.5 gms. |
| 7) CA-90 base material | 53 gms. |

EXAMPLE 4

This example is carried out to determine the mildewcidal properties of paint treated with the novel compositions of the present invention. The method employed in this example is Standard Federal Specification No. 141, Method No. 6271.

An equal weight ratio of 0.7 parts of the novel composition of this invention as prepared in Example 1, and 0.7 parts of phenyl mercurial acetate are added directly to one gallon of an exterior acrylic and exterior oil paint, and mechanically mixed therein prior to preparation of text panels.

The following test organisms are used:
1. Aspergillus niger QMRDC 458;
2. Aspergillus oryzae;
3. Pullularia pullulans ATCC 9348;
4. Pencillium ochrochloron QMRDC 476.

Test panels are painted with a first coat of the above-prepared paint containing the novel compositions of the present invention and allowed to dry for 48 hours. A second coat is applied and allowed to dry for 72 hours. The test panels are then exposed for 180 days to each of the above organisms. All tests are carried out in quadruplicate with a single control.

After 180 days, growth of the organisms on the test panels is determined. The test panels coated with paint having the novel compositions of the present invention admixed therein show no growth of the microorganisms. The control test panels, however, exhibit growth of all of these organisms.

These tests establish that the novel products of this invention can be incorporated in an exterior paint to inhibit the growth of test fungi in accordance with the standard federal test procedures.

EXAMPLE 5

This example is carried out to determine the bacteriostatic and bactericidal of the novel compositions of the present invention. The procedures used in this Example for the maintenance of cultures, growth media inoculation, etc., are those specified in A. O. A. C. method 5.001–5.005 and 5.01–5.022, and the methods for the bacteriostatic and bactericidal tests are those described in *Disinfection and Sterilization*, 1st Ed., George Sykes. The composition produced in Example 1 is tested in this example in each of the following dilutions: (1) 1:100; (2) 1:200; (3) 1:400; (4) 1:1,000; (5) 1:5,000; (6) 1:10,000; (7) 1:15,000. All dilutions are made with distilled water by use of ultrasonification in accordance with FDA procedures for dispersion of bactericidal agents. The composition of this invention is tested against the following organisms:
1. Staphylococcus aureus (FDA No. 209)
2. Streptococcus pyogenes ATTC 9342.

Surface inhibition and surface contact lethal test are conducted with these organisms.

In the surface inhibition, the test dilutions of CA-100 are spread on the surface of Brain Heart Infusion agar plates and allowed to dry. Then the plates and 0.2 ml of test cultures previously grown on Trypticase soy broth were placed in shake cultures of 200 ml for 48 hours and examined for growth. A control is run parallel with 1-(3-chloroally) - 3,5,7-triaza-1-azoniaadamantane chloride, obtained under the trademark Dowicil-100 from Dow Chemical Co. Results of the surface inhibition test are reported below in Table 1.

TABLE 1

Results of Surface Inhibition

| Dilution of Test Material CA-100 | Staphylococcus Aureus | Streptococcus Pyogenes | Control Dowicil-100 |
|---|---|---|---|
| 1:100 | − | − | − |
| 1:200 | − | − | − |
| 1:400 | − | − | − |
| 1:1,000 | − | − | + |
| 1:5,000 | − | − | ++ |
| 1:10,000 | − | − | +++ |
| 1:15,000 | + | + | +++ |

Symbols Used:
− No Growth
+ Slight Growth
++ Over Growth
+++ Heavy Growth

In the surface contact lethal test, Brain Heart Infusion is poured over cultures of the test organisms on agar plates. Each test dilution is inoculated thickly over the surface of 24 hour old cultures of the test organism, and the cultures are then incubated. The cultures are then exposed to the test dilutions at intervals. Disks are taken out with a sterile cork borer and transferred to tubes of Trypticase soy broth. The disks are then exposed to the test dilutions for the following intervals: 15 sec., 30 sec., 60 sec., 2 min., 3 min., 5 min., and 10 min. After 48 hours the broth is carefully examined for growth. Results of these tests are reported in Table 2 below.

TABLE 2

Surface Lethal Test for Staphylococcus Aureus & Streptococcus Pyogenes

| Dilution | Time (Minutes) | | | | | | | |
|---|---|---|---|---|---|---|---|---|
| | .25 | .5 | 1 | 2 | 3 | 4 | 5 | 10 |
| 1–100 | − | − | − | − | − | − | − | − |
| 1–200 | − | − | − | − | − | − | − | − |
| 1–400 | − | − | − | − | − | − | − | − |
| 1–1,000 | − | − | − | − | − | − | − | − |
| 1–5,000 | − | − | − | − | − | − | − | − |
| 1–10,000 | − | − | − | − | − | − | − | − |
| 1–15,000 | + | + | + | + | + | + | + | + |
| (Control) | − | − | − | + | ++ | +++ | + | +++ |

These tests show that the compositions of this invention diluted up to 1:10,000 are active surface growth inhibitors, against the test organisms. On the surface lethal test, the compositions are effective against *Staphylococcus aureus* 209, in killing the organism in a period of 30 seconds. *Streptococcus pyogenes* 9342 is inactivated in 15 minutes.

EXAMPLE 6

This example is carried out to determine the antifungal and antimildew efficiency of the compounds of the invention when formulated into a alkyl exterior paint. The method employed in this example is Federal Specification 141, Method 671, Sept. 11, 1965.

Samples of paint are prepared having three different concentrations of the composition of this invention as prepared in Example 1. One paint is prepared containing 0.5 fluid ounces of the CA-100 composition per gallon, a second containing 0.25 fluid ounces of the CA-100 composition per gallon, and third containing 1 fluid ounce of the CA-100 composition per gallon. In addition, control paints containing 0.5 fluid ounces of Dowicil S13 (Dow Chemical Co.) per gallon, 0.5 fluid ounces of phenyl mercurial acetate (PMA) per gallon, 0.5 fluid ounces of phenyl Mercury Oleate (PMO) per gallon, and 0.5 fluid ounces of Dowicil—100 per gallon are prepared.

Square of Whatman No. 40 filter paper (2 × 2 cm) are painted on one side with each of the above paints and dried at room temperature for 24 hours. The reverse sides are then painted and allowed to dry for 48 hours.

The painted filter squares are leached with a flow of distilled water at 27°–30°C for a total of 24 hours, with the wash cycle being changed every 4 hours. The painted squares are then air dried for 24 hours at room temperature.

The above-prepared squares are tested against the following microorganisms:
1. Aspergillus niger ATCC 6225
2. Aspergillus oryzae ATCC 1096
3. Pullularia pullulans ATCC 9348

Petri dishes containing Sabouraud's medium are inoculated with the above organisms and each of the painted filter squares are contacted with the petri dishes, which are then incubated at 30°C at a relative humidity between 85–90 percent.

All plates are incubated at 30°C for 21 days. Zones of inhibition are periodically recorded by measuring the distance from the filter edge to the growing organisms in millimeters. All tests are conducted in triplicate. These results are reported in Table 3 below.

bacterial efficiency of the compounds of the invention as prepared in Example 1 against the following organisms.

| | |
|---|---|
| Klebsiella pneumoniae | ATCC-10031 |
| Escherichia coli | ATCC-9637 |
| Salmonella achottmuelleri | ATCC-8759 |
| Shigella flexneri | ATCC-9199 |
| Staphylococcus aureus | ATCC-6538 |
| Proteus vulgaris | ATCC-8427 |
| Candida albicans | ATCC-752 |
| Aspergillus niger | QMRDC-458 |
| Penicillium funiculosum | QMRDC-474 |
| Mycobacterium smegmatis | ATCC-607 |

The bacterial species are seeded into sterile enriched nutrient agar plates at the rate of 1.0 ml per 20 ml of media.

The yeast and mold cultures are swabbed on the surface of Sabouraud's agar plates. Each agar plate is divided into quadrants, and to the center of each quadrant is added a sterile, 1.0 cm.$^2$, piece of filter paper. One filler disc serves as a control, and to the remaining three discs are added varying amounts of the composition of this invention as follows:
1. 0.01 ml (0.8 mg. active)
2. 0.02 ml (1.6 mg. active)
3. 0.03 ml (2.4 mg. active)

The bacterial plates are incubated for 24 hours at 37.5°C, and the results recorded according to the zone of inhibition. The yeast and mold plates are incubated at 22°–25°C, and the results are recorded according to the zones of inhibition. The zones are measured as the average diameter and the results reported in Table 4 below.

TABLE 3

Results After 10 Days Incubation, Zone Inhibition in Millimeters

| Organisms | Dowicil S-13 0.5 | PMO 0.5 | PMA 0.5 | Dowicil 100 0.5 | CA 100 0.5 | CA 100 0.75 | CA 100 1 |
|---|---|---|---|---|---|---|---|
| Aspergillus niger | 3mm | 5mm | 4mm | 3mm | 5mm | 8mm | 10mm |
| Aspergillus oryzae | 2mm | 3mm | 2mm | 2mm | 3mm | 4mm | 6mm |
| Pullumaria pullulans | 4mm | 3mm | 5mm | 3mm | 4mm | 5mm | 9mm |

Results After 21 Days Incubation, Zone Inhibition in Millimeters

| Organisms | Dowicil S-13 0.5 | PMO 0.5 | PMA 0.5 | Dowicil 100 0.5 | CA 100 0.5 | CA 100 0.75 | CA 100 1 |
|---|---|---|---|---|---|---|---|
| Aspergillus niger | 1 | 1 | 2 | none | 2½ | 2½ | 4 |
| Aspergillus oryzae | none | 1½ | 1 | none | ½ | 2 | 2½ |
| Pullumaria pullulans | none | 1 | none | ½ | 1 | 3 | 4 |

All fungicides tested under this specification are effective against the test organisms in the first 10 days of incubation period. After 21 days of incubation, the zones of inhibition are decreased from the control. These tests show that the composition of the present invention is the most effective fungicide against the test organisms, and meets the requirements under the Federal Specification No. 141, Method 671 as a fungicide.

EXAMPLE 7

This example is carried out to determine the antibacterial efficiency of the compounds of the invention

TABLE 4

Zone of Inhibition - Diameter in Millimeters

| Organism | 0.8 mg. | 1.6 mg. | 2.4 mg. |
|---|---|---|---|
| Klebsiella pneumoniae | 14 | 22 | 25 |
| Escherichia coli | 18 | 18 | 18 |
| Salmonella schottmuelleri | 14 | 22 | 25 |
| Salmonella typhosa | 13 | 11 | 12 |
| Staphylococcus aureus | 30 | 30 | 33 |
| Shigella flexneri | 20 | 20 | 24 |
| Proteus vulgaris | 22 | 22 | 28 |
| Candida albincans | 21 | 24 | 28 |
| Aspergillus niger | 30 | 35 | 36 |

TABLE 4-Continued

Zone of Inhibition - Diameter in Millimeters

| Organism | 0.8 mg. | 1.6 mg. | 2.4 mg. |
|---|---|---|---|
| Penicillium funiculosum | 29 | 31 | 36 |
| Mycobacterium smegmatis | 36 | 40 | 54 |

In all instances the control square shows no inhibition of growth.

Use of the CA-100 composition of this invention on a surface of the media presented the problem of adequate dispersion of the composition over the surface, particularly where large volumes are used. However, a complete zone of inhibition is produced at all places that the composition actually contacts. This zone penetrated the depth of the agar, and its depth is rather difficult to evaluate. However, the anti-bacterial properties against the test organisms are universally present, and with the exception of Salmonella typhosa, the zones of inhibition are significant at all concentrations.

EXAMPLE 8

This example is carried out to determine the minimal inhibitory concentration of the compositions of this invention. The CA-100 composition, as prepared in Example 1, is diluted with acetone to the following weight percent levels: 10; 5; 1; 0.5; 0.1; 0.05; 0.01; 0.005; 0.001; 0.0005; 0.001; 0.00005; 0.00001. Sensitivity discs (1 cm²) are prepared from these dilutions. A number of the discs are centered in petri plates of Sabouraud Dextrose agar and inoculated with *Rhizopus nigricans*, *Penicillium notatum*, *pollularia pollutans*, *Aspergillus oryzae*, *Aspergillus niger*. These fungi plates are incubated at 25°C for 21 days. The remaining discs are entered on plates of Nutrient Agar and inoculated with *Staphylococcus aureus*, *Pseudomones aeruginosa*, *Escherichia coli*, *Bacillus subtilis*, *Serratia narcescens*, *Sarcina subtlava*. These bacteria are incubated at 30°C, for 72 hours. Means zones of inhibition are determined from the edge of each disc.

Data is plotted semilogarithmically with concentration on the longarithm axis and inhibition on the linear axis, MIC is determined from the point of intercept on the concentration axis.

The MIC for each test organisms is reported in Table 5 below.

TABLE 5

MIC of CA-100 on Various Bacteria and Fungi

| Organisms | MIC (%) |
|---|---|
| 1) Staphylococcus aureus | 0.0035 |
| Pseudomonas aeruginosa | 0.035 |
| Escherichia coli | 0.95 |
| Bacillus subtilis | 0.015 |
| Serratia nacescens | 3.0 |
| Sarcina subtlava | 0.006 |
| 2) Rhizopus nigricans | 0.035 |
| Penivillium notatum | 0.015 |
| Pollularia pollutans | 0.025 |
| Aspergillus oryzae | 0.030 |
| Aspergillus niger | 0.025 |

EXAMPLE 9

This example is carried out to determine the mildewcidal and fungicidal properties of paint treated with the novel compositions of the present invention. The method employed in this example is Standard Federal Specification No. 141, Method No. 6271.

Three alkyl exterior paint samples are prepared each containing 0.75 parts of a mildewcidal and fungicidal agent. The first paint contains the CA-100 composition of this invention as prepared in Example 3, the second paint contains phenyl mercurial oleate (PMO), and the third paint contains phenyl mercurial acetate (PMA).

The following test organisms are used:
1. Aspergillus niger ATCC 6275
2. Pullularia Pullulans ATCC 9348
3. Aspergillus oryzae Sterile Whatman filters 4.25 cm are painted on one side and allowed to dry for 24 hours. The reverse side is then painted and allowed to dry for 48 hours. The painted filters are leached with distilled water for a total of 24 hours, with the wash cycle being changed every 4 hours. The leached filters are then oven dried at 60°C for 24 hours.

Freshly prepared Sabouraud's agar is inoculated with the selected mold or fungi organism, and a test filter is set into the center of each plate and incubated for 14 days at 28° – 30°C. The results are determined by measuring the inhibition zone from the filter edge to the growing organism in millimeters and are reported in Table 6 below.

TABLE 6

Results After Two Weeks Incubation

| Organism | CA-100 0.75 | PMO 18% 0.75 | PMA 18% 0.75 |
|---|---|---|---|
| As. niger | 2mm | 2mm | 1mm |
| Pull. pull | 2½mm | 1½mm | 1½mm |
| As. oryzae | 2mm | 1½mm | 1mm |

These tests show that the composition of the present invention is the most effective fungicide against the test organisms, and meets the requirements under the Federal Specification No. 141, Method No. 671 as a fungicide.

The invention in its broader aspects is not limited to the specific details shown and described and departures may be made from such details without departing from the principles of the invention and without sacrificing its chief advantages.

What is claimed is:

1. A method of preparing an antibacterial and antifungal composition comprising:
    1. adding tetrachloroethylene to an organic alcoholic ether selected from the group consisting of 2-phenoxy-ethanol, diethylene glycol methyl ether, ethylene glycol ethyl ether, and mixtures thereof, at a temperature between about 180° and 200°F. to form a first intermediate mixture the weight ratio of tetrachloroethylene to alcoholic ether being about between 3:2 and 2:3;
    2. adding, based on 140 to 160 grams of organic ether, between about 16 to 21 grams of 2,3,5,6-tetrachloro-4-(methyl sulfonyl) pyridine, between about 40 to 46 grams of salicylanilide, and 30 to 50 grams of a polyhalo substituted diaryl selected from the group consisting of 3,4,5,-tribromosalicylanilide, 2,4,4'-trichloro-2'-hydroxydiphenyl ether, and mixtures thereof, to the mixture of step 1 to obtain a reaction mixture, said additions being carried out at a temperature between about 180° and 200°F;

3. adding, based on 140 to 160 grams of organic ether, 3 to 5 grams of at least one substituted dimethyl benzyl ammonium chloride to the reaction mixture and heating at a temperature between about 180° and 200°F. to obtain a final reaction product; and 4. adding, to said final reaction product, based on 140 to 160 grams of alcoholic ether, between about 20 to 85 grams of a grapefruit derivative prepared by reacting the pulps of fresh grapefruit with a non-toxic polyhydric alcohol in the presence of ultraviolet light, and separating the resultant grapefruit derivative from the pulp residue.

2. The method of claim 1 wherein the substituted dimethyl benzyl ammonium chloride substituent is a diisobutylphenoxyethoxyethyl group, diisobutylcresoxyethoxyethyl group or an n-alkyl-substituent, said n-alkyl-substituent being a mixture of about 50% $C_{12}H_{25}$ groups, 40% $C_{16}H_{33}$ groups, and about 10% $C_{14}H_{29}$ groups.

3. The method according to claim 1 wherein each step employed in preparing said final reaction product is carried out until a clear solution is obtained.

4. The method according to claim 3 wherein each step employed in preparing said final reaction product is carried out with agitation for a short time until a clear solution is obtained, and after a clear solution is obtained during the last step employed in preparing said final reaction product, agitation is terminated and the reaction mixture maintained at 180° to 200°F. for about 2 hours.

5. The method according to claim 1 wherein the weight ratio of tetrachloroethylene to alcoholic ether is 140 to 160 grams of tetrachloroethylene to 140 to 160 grams of the alcoholic ether.

6. A method for controlling and destroying fungi and bacteria which comprises applying to an area contaminated with such fungi and bacteria a fungicidally and bactericidally effective amount of the composition prepared by the method of claim 1.

7. A method of preparing an antifungal and antibacterial composition comprising:

1. adding tetrachloroethylene to an organic alcoholic either selected from the group consisting of 2-phenoxy-ethanol, diethylene glycol methyl ether, ethylene glycol ethyl ether, and mixtures thereof, at a temperature between about 180° and 200°F. to form a first intermediate mixture, the weight ratio of tetrachloroethylene to alcoholic ether being about between 3:2 and 2:3;

2. adding, based on 140 to 160 grams of organic ether, between about 16 to 21 grams of 2,3,5,6-tetrachloro-4-(methyl sulfonyl) pyridine, between about 40 to 46 grams of salicylanilide, and 30 to 50 grams of a polyhalo substituted diaryl selected from the group consisting of 3,4,5-tribromosalicylanilide, 2,4,4'-trichloro-2'-hydroxydiphenyl ether, and mixtures thereof, to the mixture of step 1 to obtain a reaction mixture, said additions being carried out at a temperature between about 180° and 200°F.;

3. adding, based on 140 to 160 grams of organic ether, 3 to 5 grams of at least one substituted dimethyl benzyl ammonium chloride to the reaction mixture and heating at a temperature between about 180° and 200°F. to obtain a final reaction product; and 4. adding, to said final reaction product, based on 140 to 160 grams of alcoholic ether, between about 20 to 85 grams of a grapefruit derivative prepared by reacting the pulps of fresh grapefruit with a non-toxic polyhydric alcohol in the presence of a free radical initiator selected from the group consisting of tertiary butyl hydroperoxide, azobisbutyronitrile, and dicumyl peroxide, and separating the resultant grapefruit derivative from the pulp residue.

8. A method of preparing an antibacterial and antifungal composition comprising:

1. adding tetrachloroethylene to an organic alcohol ether selected from the group consisting of 2-phenoxyethanol, diethylene glycol methyl ether, ethylene glycol ethyl ether, and mixtures thereof, at a temperature between about 180° and 200°F. to form a first intermediate mixture the weight ratio of tetrachloroethylene to alcoholic ether being 140 to 160 grams tetrachloroethylene to 140 to 160 grams of alcoholic ether;

2. adding, based on 140 to 160 grams of organic ether, between about 16 to 21 grams of 2,3,5,6-tetrachloro-4-(methyl sulfonyl) pyridine, between about 40 to 46 grams of salicylanilide, 61 to 85 grams of a trihydrocarbyltin neoalkanoate selected from the group consisting of tributyltin neodecanoate, tributyltin neopentanoate, tributyltin neohexanoate, triethyltin neodecanoate and trimethyltin neodecanoate, and 10 to 17 grams of a polyhalo substituted diaryl selected from the group consisting of 3,4,5-tribromosalicylanilide, 2,4,4°-trichloro-2°-hydroxydiphenyl ether, and mixtures thereof, to the mixture of step 1 to obtain a reaction mixture, said additions being carried out at a temperature between about 180° and 200°F;

3. adding, based on 140 to 160 grams of organic ether, 3 to 5 grams of at least one substituted dimethyl benzyl ammonium chloride to the reaction mixture and heating at a temperature between about 180° and 200°F. to obtain a final reaction product; and 4. adding, to said final reaction product, based on 140 to 160 grams of alcoholic ether, between 20 to 85 grams of a grapefruit derivative prepared by reacting the pulps of fresh grapefruit with a non-toxic polyhydric alcohol in the presence of ultra-violet light, and separating the resultant grapefruit derivative from the pulp residue.

9. The method of claim 8 wherein the substituted dimethyl benzyl ammonium chloride substituent is a diisobutyl-phenoxyethoxyethyl group, diisobutylcresoxyethoxyethyl group or an n-alkyl-substituent, said n-alkyl-substituent being a mixture of about 50% $C_{12}H_{25}$ groups, 40% $C_{16}H_{33}$ groups, and about 10% $C_{14}H_{29}$ groups.

10. The method of claim 8 wherein each addition step is carried out until a clear solution is obtained.

11. The method of claim 8 wherein the trihydrocarbyltin neoalkanoate is tributyltin neodecanoate.

12. A method for controlling and destroying fungi and bacteria which comprises applying to an area contaminated with such fungi and bacteria a fungicidally and bactericidally effective amount of the composition prepared by the method of claim 8.

* * * * *